July 7, 1931.  E. A. FRANKS  1,813,614
TRANSMISSION GEAR FOR USE WITH INTERNAL COMBUSTION ENGINES
Filed Aug. 8, 1930
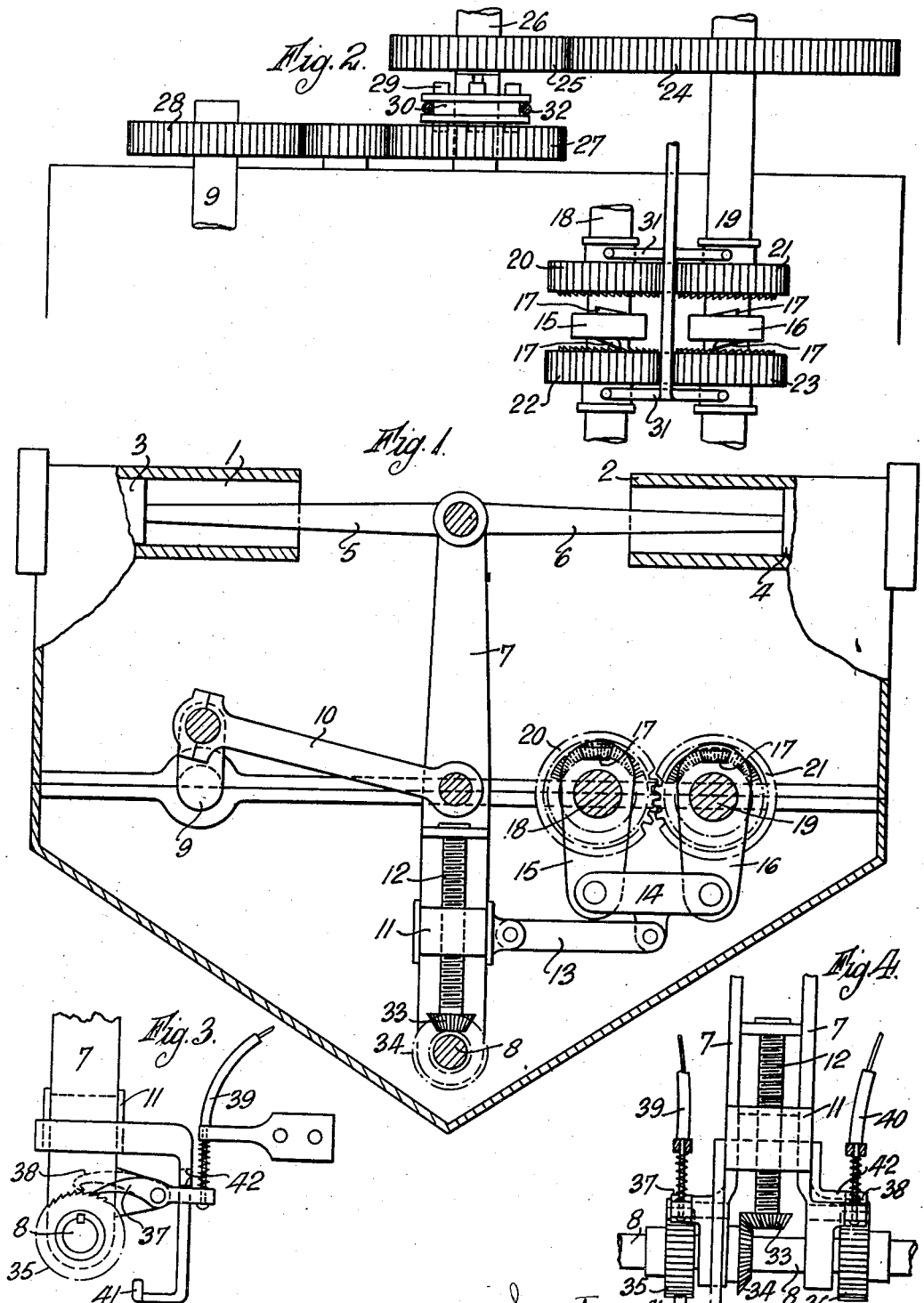

Patented July 7, 1931

1,813,614

UNITED STATES PATENT OFFICE

ERNEST ARTHUR FRANKS, OF WHITCHURCH, WALES

TRANSMISSION GEAR FOR USE WITH INTERNAL COMBUSTION ENGINES

Application filed August 8, 1930, Serial No. 473,999, and in Great Britain June 13, 1929.

This invention relates to improvements in the transmission of power developed by internal combustion engines, and is especially applicable to engines of the Diesel type.

The invention relates more particularly to variable speed transmission mechanism, comprising a power driven rocker arm which transmits power to means for converting the oscillatory movement of the rocker arm into uni-directional rotation of a shaft, means being provided for varying the extent of rotation of the shaft for each oscillation of the arm.

According to the present invention there are provided two rotatable members which are rotated uni-directionally by the rocker arm, means for varying the extent of rotation of one of the members for each oscillation of the arm, and a clutch device for selectively coupling the members to a transmission member.

In order to enable the apparatus to be formed as an integral part of an internal combustion engine, the rocker arm is preferably coupled to the piston- or connecting-rod of the engine.

The invention is illustrated in the accompanying drawings, in which Figure 1 is a longitudinal section, Figure 2 a part plan, and Figures 3 and 4 detail views.

1, 2 are opposed cylinders having pistons 3, 4 whose piston rods 5, 6 are pivotally connected to the outer end of a rocker arm 7 freely mounted on a normally stationary shaft 8. 9 is a crank shaft having a crank coupled to the rocker arm 7 by a connecting rod 10, the position of the pivotal connection of the connecting rod 10 to the rocker arm 7 being governed by the desired ratio of piston stroke to crank throw.

Slidably mounted on the rocker arm 7 is a block 11 which is screw-threaded to receive a screwed rod 12 rotatably carried by the rocker arm 7. To the block is pivotally connected one end of a link 13 whose other end is pivotally connected to a link bar 14 connecting a pair of pawl discs 15, 16 having pawls indicated at 17. The pawls on opposite faces of each disc 15 16 are oppositely directed, and the pawls on the disc 15 are oppositely directed with respect to the pawls on the corresponding face of the other disc 16.

The discs are freely mounted on lay shafts 18, 19, on which are slidably but non-rotatably mounted ratchet wheels 20, 21 and 22, 23, which are formed with teeth to correspond with the direction of the adjacent pawls. The wheels 20, 21 and 22, 23 are respectively geared together by gear teeth formed thereon, and the shaft 19 is extended and has secured to its end a gear wheel 24. This gear wheel 24 is geared to a gear wheel 25 rotatably mounted on a cardan shaft 26 on which is also rotatably mounted a gear wheel 27 geared to a gear wheel 28 on the crank shaft 9. The gear wheels 25 and 27 are provided with recesses to receive dogs 29 formed on a clutch member 30 slidably but non-rotatably mounted on the cardan shaft 26.

The arrangement is such that when the block is at its maximum distance from the shaft 8 the ratio of the rotary motion of the lay shaft 19 to the rotary motion of the crank shaft 9 is equal or approximately equal to the ratio of the gear wheels connecting the lay shaft and the crank shaft to the countershaft, so that in this extreme position of the block the gear wheels 25, 27 are driven at the same speed or at approximately the same speed.

Operating forked members 31, 32 are provided for sliding the ratchet wheels 20, 21 and 22, 23 and the clutch member 30 respectively.

The lower end of the screw-threaded rod 12 is fast with a bevel wheel 33 in mesh with a bevel wheel 34 fast with the shaft 8. This latter has also secured to it a pair of ratchet wheels 35, 36 whose teeth are directed in opposite directions and are adapted to be engaged by oppositely directed pawls 37, 38, pivotally carried by the rocker arm 7. The pawls 37, 38 are capable of being moved into engagement with the ratchet wheels through Bowden controls 39, 40, which may conveniently be actuated from the dashboard of an automobile.

The block 11 is also provided with extensions 41, 42 which are adapted respectively to engage the pawls 37, 38 at the extreme positions of the block, and thereby prevent the pawls from being moved into engagement with the ratchet wheels.

In operation, reciprocal motion of the pistons is transmitted to the rocker arm 7 which is thereby rocked about the shaft 8. The lever transmits motion through the connecting rod 10 to the crank shaft 9, and also through the link 13 to the pawl discs 15, 16. When the rocker arm 7 is moving in one direction, the pawls on one disc drive the corresponding ratchet wheel in one direction, and when the lever is moving in the other direction, the pawls on the other disc of the pair drive the corresponding ratchet wheel in the opposite direction, and since the ratchet wheels are geared together the shaft 19 is driven continuously in one direction. This direction can be reversed by operating the member 31 to slide the ratchet wheels along their shafts to move those wheels which were being driven from engagement with their pawls, and the other ratchet wheels into engagement with their pawls.

If it be desired to increase the amount of movement transmitted from the oscillating rocker arm 7 to the lay shaft, the block 11 is caused to slide along the lever further from the pivotal axis thereof, by operating one of the Bowden cables which moves the corresponding pawl 37 into engagement with its ratchet wheel 35. Thus, during one half of the oscillation of the rocker arm 7, the pawl rotates the ratchet wheel which in turn rotates the shaft 8, the bevel gears 34, 33, and finally the screw-threaded rod 12 which actuates the block.

If it be desired to decrease the amount of movement, the other Bowden cable is actuated, whereby the other oppositely directed pawl actuates its ratchet wheel in the reverse sense, and thus the block is moved towards the pivotal axis of the rocker arm 7.

Damage due to the continued action of the screw-threaded rod 12, when the nut has reached its extreme position, is prevented by the projections 41, 42 which engage and move the pawls out of engagement with their ratchet wheels at the extreme positions of the block.

The full working stroke of the pawls 17 with respect to the minimum distance of the block 11 from the pivotal axis of the lever is such that when the block is in its position of minimum drive, the extent of motion imparted to the pawls is insufficient to enable the pawls to drop behind a tooth: by this means a neutral position for the lay shaft 19 is obtained.

When the block is at its maximum distance from the pivotal axis of the rocker arm 7, the speed of the gear wheel 25 is the same as or approximately equal to the speed of the gear wheel 27, whereby the clutch can be moved smoothly from engagement with the gear wheel 25 to the gear wheel 27, the drive thus being transmitted as a direct drive from the crank shaft and disconnected from the variable speed lay shaft.

The apparatus thus affords an infinitely variable gear, the drive from low to maximum speed being obtained firstly through the lay shaft and then as a direct drive through the crank shaft.

The apparatus also enables a long stroke Diesel type of engine to be employed with a small throw crank shaft.

What I claim is:—

1. The combination of a power actuated rocker arm, a shaft, a uni-directional drive device for the shaft, a link coupled to the drive device and to the rocker arm, and means for varying the point at which the link is coupled to the arm, comprising a block which is mounted on the arm and to which the link is pivotally connected, a screwed rod rotatably carried by the arm and adapted, when rotated, to displace the block, a spindle on which the rocker arm is pivotally mounted, gearing connecting the spindle and the screwed rod, pawl and ratchet members carried respectively by the rocker arm and the spindle, and manually operable means for controlling engagement between the pawl and ratchet members.

2. The combination of horizontally opposed cylinders, pistons therein, a rocker arm, piston rods coupling the pistons to the rocker arm, two shafts, a connecting rod and crank connection coupling the arm to one shaft, and means for converting oscillatory movement of the arm into variable uni-directional rotation of the other shaft, a transmission shaft, and means for selectively coupling the shafts to the transmission shaft.

3. The combination of a power actuated rocker arm, a shaft, a uni-directional drive device for the shaft, a link coupled to the arm and to the uni-directional drive device, and manually controlled means for utilizing the movement of the rocker arm to vary the point at which the link is coupled to the rocker arm, said last named means comprising a screw-threaded rod rotatably mounted on the arm, a block slidably mounted on the arm and to which the link is connected, said block being engaged by the screw-threaded rod and slid along the arm thereby as the screw-threaded rod is rotated, ratchet wheels in driving connection with the screw-threaded rod and pawls mounted on the arm and adapted to be moved into engagement with the ratchet wheels.

4. The combination of a power actuated rocker arm, a shaft, a uni-directional drive device for the shaft, a link coupled to the arm and to the uni-directional drive device, and manually controlled means for utilizing the movement of the rocker arm to vary the point at which the link is coupled to the rocker arm, said last named means comprising a screw-threaded rod rotatably mounted on the arm, a block slidably mounted on the arm and to which the link is connected, said block being engaged by the screw-threaded rod and slid along the arm thereby as the screw-threaded rod is rotated, ratchet wheels in driving connection with the screw-threaded rod, pawls mounted on the arm and adapted to be moved into engagement with the ratchet wheels, and means for rendering the pawls inoperative at each extreme position of the block.

5. In the transmission of power developed by an internal combustion engine having a travelling piston, the combination of a power rocker arm, means connecting the arm for movement with the piston, a crank shaft coupled to the rocker arm at a point between the pivotal axis of the arm and the point at which the arm is connected for movement with the piston, a second shaft which is coupled to the arm at a point which is variable between the pivotal axis of the arm and the point at which the crank shaft is coupled thereto, a transmission shaft and a clutch device for selectively coupling the shafts to the transmission shaft.

6. In the transmission of power developed by an internal combustion engine, the combination of a rocker arm which is oscillated by the engine, two rotatable members, means for converting oscillatory movement of the rocker arm into uni-directional rotation of the members, means for utilizing the oscillation of the rocker arm for varying the extent of rotation of one of the members for each oscillation of the rocker arm, said last named means including movement imparting devices associated with said one member, a block slidable along said arm and having a threaded bore, a link connecting the block with the movement imparting devices, a screw-threaded rod rotatable in the block bore to slide the block along the arm, ratchet wheels in driving connection with the screw-threaded rod, and pawls carried by the arm and movable in engagement with the ratchet wheels for the purpose described, a transmission member and means for selectively coupling the members to the transmission member.

In testimony that I claim the foregoing as my invention I have signed my name this 31st day of July, 1930.

ERNEST ARTHUR FRANKS.